(No Model.) 2 Sheets—Sheet 1.

H. R. CASSEL.
PROCESS OF AND APPARATUS FOR THE SEPARATION OF METALS FROM ORES AND ALLOYS.

No. 300,950. Patented June 24, 1884.

Witnesses:-
Charles Arthur Allison
Harry Archibald McLellan

Inventor.
Henry Renner Cassel (No Model.) 2 Sheets—Sheet 2.

H. R. CASSEL.
PROCESS OF AND APPARATUS FOR THE SEPARATION OF METALS FROM ORES AND ALLOYS.

No. 300,950. Patented June 24, 1884.

Witnesses:
Charles Arthur Allison.
Harry Archibald McLellan

Inventor.
Henry Renner Cassel

UNITED STATES PATENT OFFICE.

HENRY RENNER CASSEL, OF NEW YORK, N. Y.

PROCESS OF AND APPARATUS FOR THE SEPARATION OF METALS FROM ORES AND ALLOYS.

SPECIFICATION forming part of Letters Patent No. 300,950, dated June 24, 1884.

Application filed January 2, 1884. (No model.) Patented in England August 9, 1883, No. 3,873.

*To all whom it may concern:*

Be it known that I, HENRY RENNER CASSEL, a citizen of the United States, residing at New York, in the county and State of New York, United States of America, have invented certain new and useful Improvements in Processes of and Apparatus for the Separation of Metals from Ores and Alloys, (for which I have applied for Letters Patent of England, No. 3,873, dated August 9, 1883;) and I do hereby declare the following to be a full, clear, and exact description of the same.

The object of this invention is to secure a rapid decomposition of the ores or alloys, and at the same time prevent deposition of the dissolved metals upon the cathode.

Figure 1:
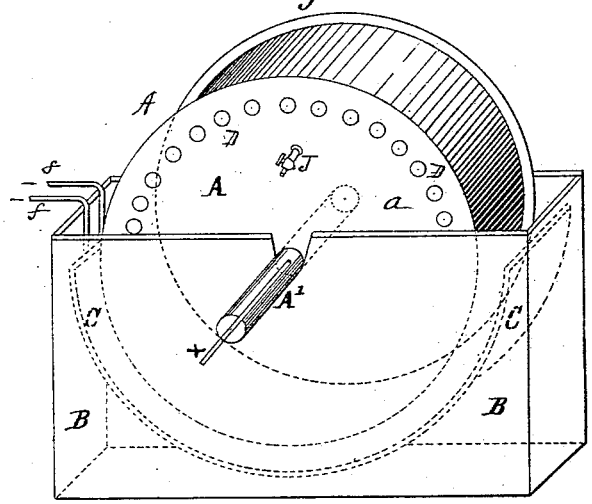
Figure 2:
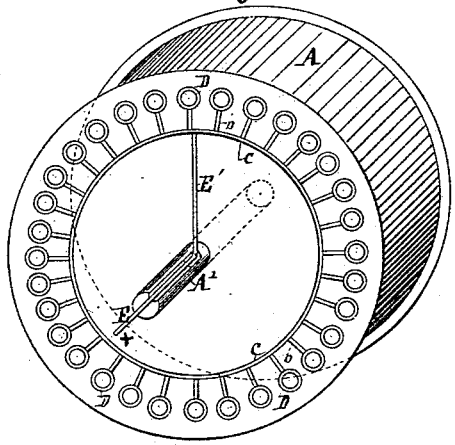
Figure 3:
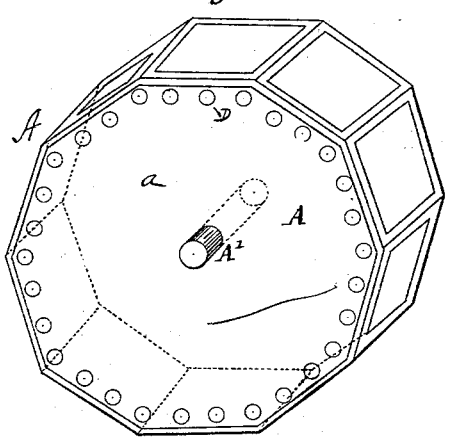
Figure 6:
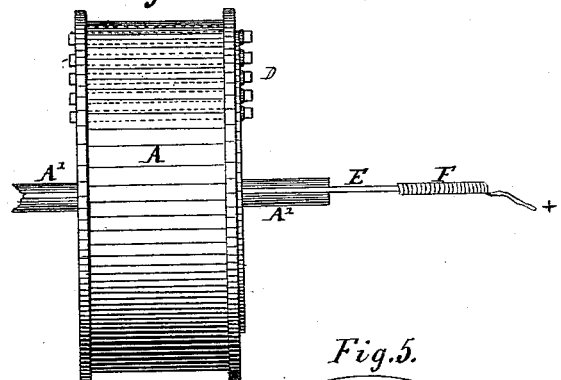
Figure 4:
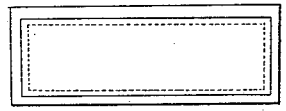
Figure 5:
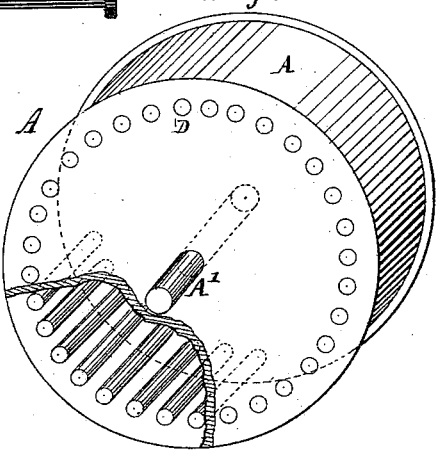
Figure 7:
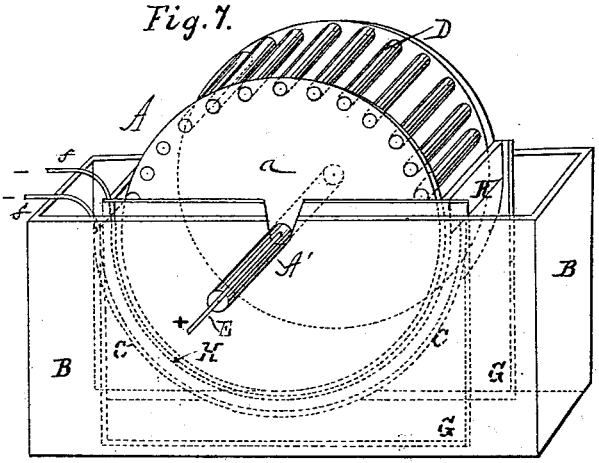
Figure 8:
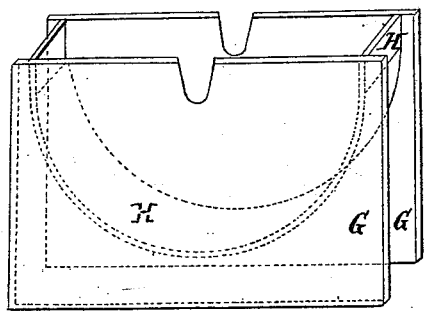
Figure 9:
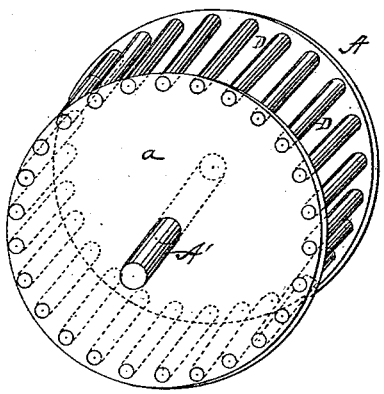

Figure 1 is a perspective view of this apparatus. Fig. 2 is a perspective view of the rotary drum which constitutes the anode-compartment of said apparatus. Fig. 3 is a perspective view of said rotary drum in a modified form. Fig. 4 is a top view of one of the porous plates or panels of the drum shown in Fig. 3. Fig. 5 is a perspective view of a circular rotary drum forming a part of this apparatus, showing a portion of one side broken away to exhibit the interior thereof. Fig. 6 is an end elevation of said drum. Fig. 7 is a perspective view of a modified form of the apparatus. Fig. 8 is a perspective view of the form of porous partition used in Fig. 7. Fig. 9 is perspective view of the rotary drum used in Fig. 7.

Similar letters of reference indicate corresponding parts.

A tank, B, round, square, or any other suitable form, provided with a cathode, C, and filled with a proper solution, constitutes the negative compartment of this apparatus, said tank being connected with the negative pole of a dynamo-electric machine by means of the wires *f*.

A rotary drum, A, fixed to a shaft, A', supported in bearings of the tank, constitutes the positive compartment of the apparatus. The heads *a* of this drum are preferably made of wood, or they may be made of metal and afterward well insulated. A series of carbon rods or plates, D, are arranged around inside the drum near the outer circumference thereof, and preferably protrude through the heads of the drum, the joints being made tight by marine glue or other means. The protruding ends of the carbons are insulated, and are connected by short wires *b* with a ring-wire, *c*. The ring-wire *c* is connected by a radial copper wire or rod, E', with a copper wire or rod, E, in the axle of the drum. The wire or rod E is connected with the positive pole of the dynamo or other source of electricity by means of a copper spiral, F, surrounding the outer end thereof, which spiral allows the drum to revolve freely and insures good contact. The carbon rods may be connected with the positive pole in any convenient manner. The drum A may be cylindrical, polygonal, or of any other suitable form, and it is separated from the solution in the negative compartment B by means of porous material, which may constitute the cylindrical body or casing of the drum between the heads, as shown in Figs. 1 to 6; or the porous material may be in the form of a stationary partition, as shown in Figs. 7 and 8. The porous material may be in the form of panels—of porous clay, for instance—as shown in Figs. 3 and 4. When the porous material revolves with the drum, an opening must be left for filling and emptying the drum, which opening must be closed water-tight by means of a cover, fastened with screws or otherwise, rubber packing being used to prevent leakage.

In the modification shown in Figs. 7, 8, and 9 the circumferential porous body of the drum is omitted, and said drum in skeleton form is separated from the negative compartment by means of a porous partition, H, preferably in a semicircular form, which partition is fitted tightly between two boards, G G, of wood or other suitable material, and placed in the tank B.

The operation is as follows: The ore or other substance to be treated is placed in a pulverized state in the drum or anode-compartment A, together with a suitable solution—such as chloride of sodium—and the drum is then connected with the dynamo-electric machine, and is made to revolve on its axis within the tank or cathode-compartment B. The ores will then be continuously thrown upon or thoroughly agitated by the carbon rods, and the chlorine generated in the drum will be enabled to reach every particle of metal and convert it into a chloride, and the separation of the anode and cathode compartments by means of the porous material prevents the dissolved materials from being precipitated upon the cathode. The closed drum is provided with a cock, J, which may be opened from time to time to allow the escape of chlorine, if such an amount thereof be generated as would be liable to cause an explosion. Several of the above-described apparatus may be placed in a circuit, care being taken that the electro-motive power is sufficient to overcome the resistance thereof. The solution will become more or less saturated, according to the richness of the ores or substances under treatment. When fully saturated or before it is filtered off, metals therein may be precipitated by proper reagents.

I am aware that it is not new, broadly, to subject ores to an electrolytic bath and to agitate the same within said bath; but in my process the deposition of the metals upon the cathode is prevented, and the apparatus has the advantage of securing a speedy and intimate contact of the chlorine generated with the whole mass of ore, so as to enable it to reach every particle of the metal contained therein, and of bringing the particles of ore in contact with the anode.

I claim as my invention and desire to secure by Letters Patent—

1. The process of separating metals from ores or alloys, especially those of an auriferous character, which consists in charging the ore or alloy in a powdered condition into an anode-compartment, which is separated from the cathode-compartment by porous material, said anode-compartment containing a solution yielding nascent chlorine under the action of an electric current, and agitating said powdered material within said solution during the passage of the electric current, substantially as described.

2. The combination, in an apparatus for treating ores and metals by electrolysis, of a cathode-compartment, a negative pole therein, a rotary drum constituting the anode-compartment, provided with porous material separating it from the cathode-compartment, and with a series of carbon rods or plates arranged within the same, and suitable electric connections, substantially as described.

HENRY RENNER CASSEL.

Witnesses:
    CHARLES ARTHUR ALLISON,
    HARRY ARCHIBALD MCLELLAN.